(12) United States Patent
Scheckel et al.

(10) Patent No.: US 12,097,546 B2
(45) Date of Patent: Sep. 24, 2024

(54) METHOD FOR SEQUESTERING IONS IN AN ENVIRONMENTAL MATRIX

(71) Applicant: United States Government, as represented by the Administrator of the U.S. EPA, Washington, DC (US)

(72) Inventors: Kirk Gerald Scheckel, Cincinnati, OH (US); Ranju R. Karna, Clinton, MS (US); Charles R. Partridge, Commerce City, CO (US); Karen D. Bradham, Apex, NC (US); David James Thomas, Chapel Hill, NC (US); Matthew R. Noerpel, Cincinnati, OH (US); Jennifer Lynn Goetz, Petersburg, KY (US); Todd Peter Luxton, Cincinnati, OH (US); Tyler Dale Sowers, Apex, NC (US)

(73) Assignee: UNITED STATES GOVERNMENT, AS REPRESENTED BY THE ADMINISTRATOR OF THE U.S. EPA, Washington, DC (US)

(*) Notice: Subject to any disclaimer, the term of this patent is extended or adjusted under 35 U.S.C. 154(b) by 145 days.

(21) Appl. No.: 17/814,172

(22) Filed: Jul. 21, 2022

(65) Prior Publication Data
US 2022/0355353 A1 Nov. 10, 2022

Related U.S. Application Data

(63) Continuation-in-part of application No. 17/450,445, filed on Oct. 8, 2021, now Pat. No. 11,414,334.
(Continued)

(51) Int. Cl.
B09C 1/08 (2006.01)

(52) U.S. Cl.
CPC ....................... *B09C 1/08* (2013.01)

(58) Field of Classification Search
CPC ......... B09C 1/08; B09C 2101/00; C02F 1/02; C02F 1/42; C02F 2001/425;
(Continued)

(56) References Cited

U.S. PATENT DOCUMENTS

| 4,305,914 A | 12/1981 | Pammenter et al. |
| 5,569,155 A | 10/1996 | Pal et al. |

(Continued)

FOREIGN PATENT DOCUMENTS

| CN | 102303041 A | 1/2012 |
| CN | 106903132 A | 6/2017 |

(Continued)

OTHER PUBLICATIONS

Ara et al, English Machine Translation JP 2003112162A, pp. 1-4 (Year: 2003).*

(Continued)

*Primary Examiner* — Claire A Norris
(74) *Attorney, Agent, or Firm* — McCoy Russell LLP

(57) ABSTRACT

Methods and systems are provided for treating a contaminated environmental medium. In one example, the treatment includes adding a first jarosite-group mineral to the contaminated environmental medium to form a wet mixture under a set of conditions. The set of conditions is maintained over a duration of time to expedite precipitation of a second jarosite-group mineral, the second jarosite-group mineral incorporating contaminant cations and contaminant anions into a structure of the second jarosite-group mineral. The first jarosite-group mineral is added in situ at a contamination site.

19 Claims, 9 Drawing Sheets

Related U.S. Application Data

(60) Provisional application No. 63/204,529, filed on Oct. 9, 2020.

(58) Field of Classification Search
CPC .......... C02F 2101/006; C02F 2101/103; C02F 2101/20; C02F 2101/22
USPC ........................................................ 210/737
See application file for complete search history.

(56) References Cited

U.S. PATENT DOCUMENTS

| | | |
|---|---|---|
| 6,139,753 A | 10/2000 | Taylor |
| 9,982,320 B2 | 5/2018 | Liddell et al. |
| 11,173,527 B2 | 11/2021 | Lee |
| 2009/0293680 A1 | 12/2009 | Ritchie et al. |

FOREIGN PATENT DOCUMENTS

| | | | |
|---|---|---|---|
| CN | 105907960 B | 8/2018 | |
| CN | 109111021 A | 1/2019 | |
| CN | 109292937 A | 2/2019 | |
| CN | 110255770 A | 9/2019 | |
| CN | 111607401 A | 9/2020 | |
| EP | 0090515 A2 | 10/1983 | |
| JP | 2003112162 A * | 4/2003 | |
| JP | 5905669 B2 | 3/2016 | |
| PH | 12011500743 B1 * | 9/2016 | .............. C02F 3/085 |
| WO | 2007101253 A2 | 9/2007 | |
| WO | 2017110964 A1 | 6/2017 | |

OTHER PUBLICATIONS

Karna, R. et al., "Bioavailable soil Pb minimized by in situ transformation to plumbojarosite," PNAS, vol. 118, No. 3, Dec. 21, 2020, 6 pages.

Kastury, F. et al., "Plumbojarosite formation in contaminated soil to mitigate childhood exposure to lead, arsenic and antimony," Journal of Hazardous Materials, vol. 418, Sep. 15, 2021, 40 pages.

* cited by examiner

METHOD FOR SEQUESTERING IONS IN AN ENVIRONMENTAL MATRIX

CROSS REFERENCE TO RELATED APPLICATIONS

The present application is a continuation-in-part of U.S. patent application Ser. No. 17/450,445, entitled "METHOD FOR SEQUESTERING IONS IN AN ENVIRONMENTAL MATRIX", and filed on Oct. 8, 2021, which claims priority to U.S. Provisional Application No. 63/204,529, entitled "METHOD FOR SEQUESTERING IONS IN AN ENVIRONMENTAL MATRIX", and filed on Oct. 9, 2020. The entire contents of the above-listed applications are hereby incorporated by reference for all purposes.

ACKNOWLEDGMENT OF GOVERNMENT SUPPORT

This invention was made with government support from the United States Environmental Protection Agency through its Office of Research and Development. The government has certain rights in the invention.

FIELD

The present description relates generally to systems and methods for ion sequestration in environmental matrices.

BACKGROUND AND SUMMARY

Remediation of contaminated environmental media may be costly and demanding of both time and energy. For example, soil may be infiltrated with materials that form cations, such as lead, and/or anions, such as arsenic, when dissolved in soil. Contaminant ions, e.g., cation and anions, present in soil may dissolve in water, thereby increasing mobility and allowing the contaminant ions to enter residential waterways which may lead to widespread health issues. Furthermore, soil may include sorbed contaminant ions which may be present in soil in a solid phase. Thus, rapid and effective removal of the contaminant ions by transformation of existing contaminant phases, when the contaminants exhibit low solubility and high stability, and/or irreversible sequestration is highly desirable.

Conventional treatment of contaminated soils may include physical removal of the soil and replacement with clean soil, which may be slow, expensive, and inefficient and may adversely affect an ecology of a source site of the clean soil. Direct remediation of the soil, either in situ or ex situ, narrows an effect of the treatment to a contaminated medium. For example, mobility of lead may be decreased by increasing soil pH to promote conversion of lead to a solid phase, such as lead carbonate. However, upon entering a digestive system of an organism, bioavailability of lead from lead carbonate may remain high due to an increased solubility of lead carbonate when subjected to low stomach pH. Other techniques include lead absorption using materials such as organic matter, clays, metals which similarly reduce mobility but do not sufficiently decrease bioavailability. Phosphate amendments may provide more effective results, driving formation of a lead-phosphate mineral known as pyromorphite. Pyromorphite, however, is sensitive to environmental conditions such as pH, organic matter content, mineral content, and ability of lead to interact with phosphate. As such, results of phosphate amendments demonstrate widely variable results, e.g., from 0-50% reduction in lead bioavailability. Furthermore, excess use of phosphate may drive accumulation of phosphates in waterways which may cause eutrophication. In addition, phosphate amendments do not address removal of other contaminant ions, such as arsenic oxyanions, radionuclides, etc.

In one example, the issues described above may be addressed by a method for treating a contaminated environmental medium, comprising adding a first jarosite-group mineral to the contaminated environmental medium to form a wet mixture under a set of conditions and maintaining the set of conditions over a duration of time to expedite ion substitution at the first jarosite-group mineral to precipitate a second jarosite-group mineral. The second jarosite-group mineral incorporates contaminant cations and contaminant anions into its structure. Furthermore, the wet mixture is formed by adding the first jarosite-group mineral to the contaminated environmental medium in situ at a contamination site. In this way, a bioavailability of more than one contaminant ion may be simultaneously minimized via a simple, effective, and low cost process.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
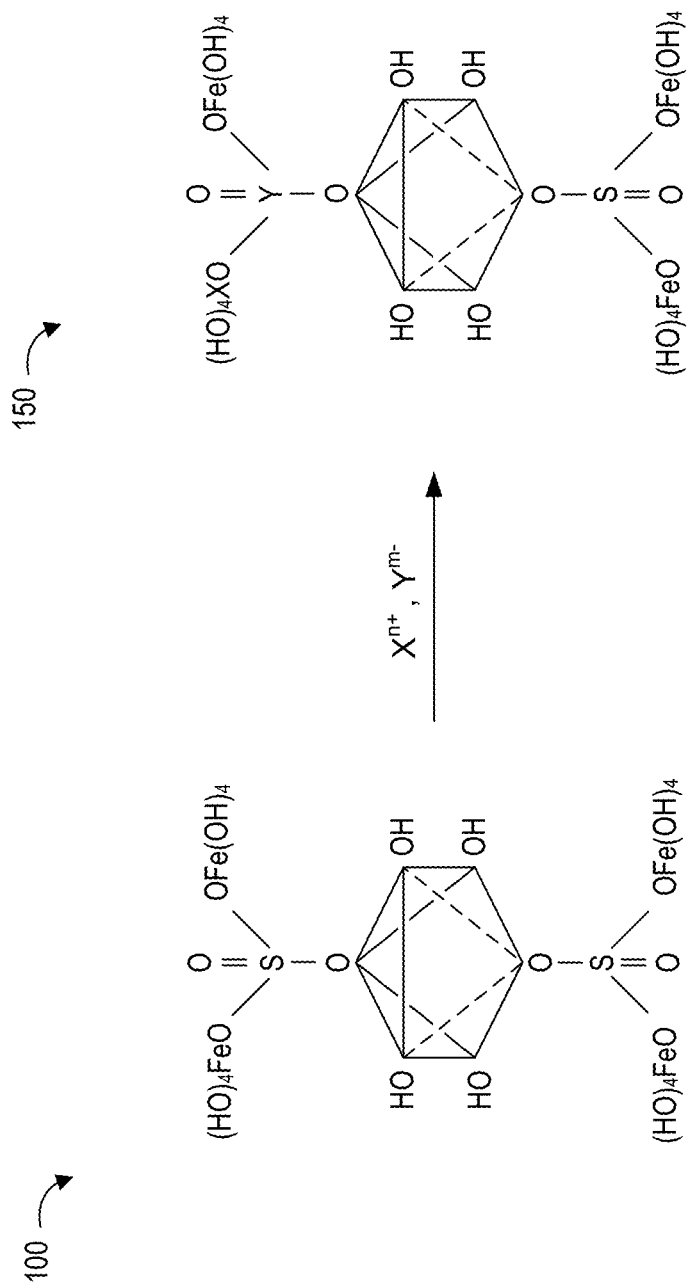
FIG. 1 shows an example of ion substitution into a mineral used to sequester contaminant ions.
Figure 2:
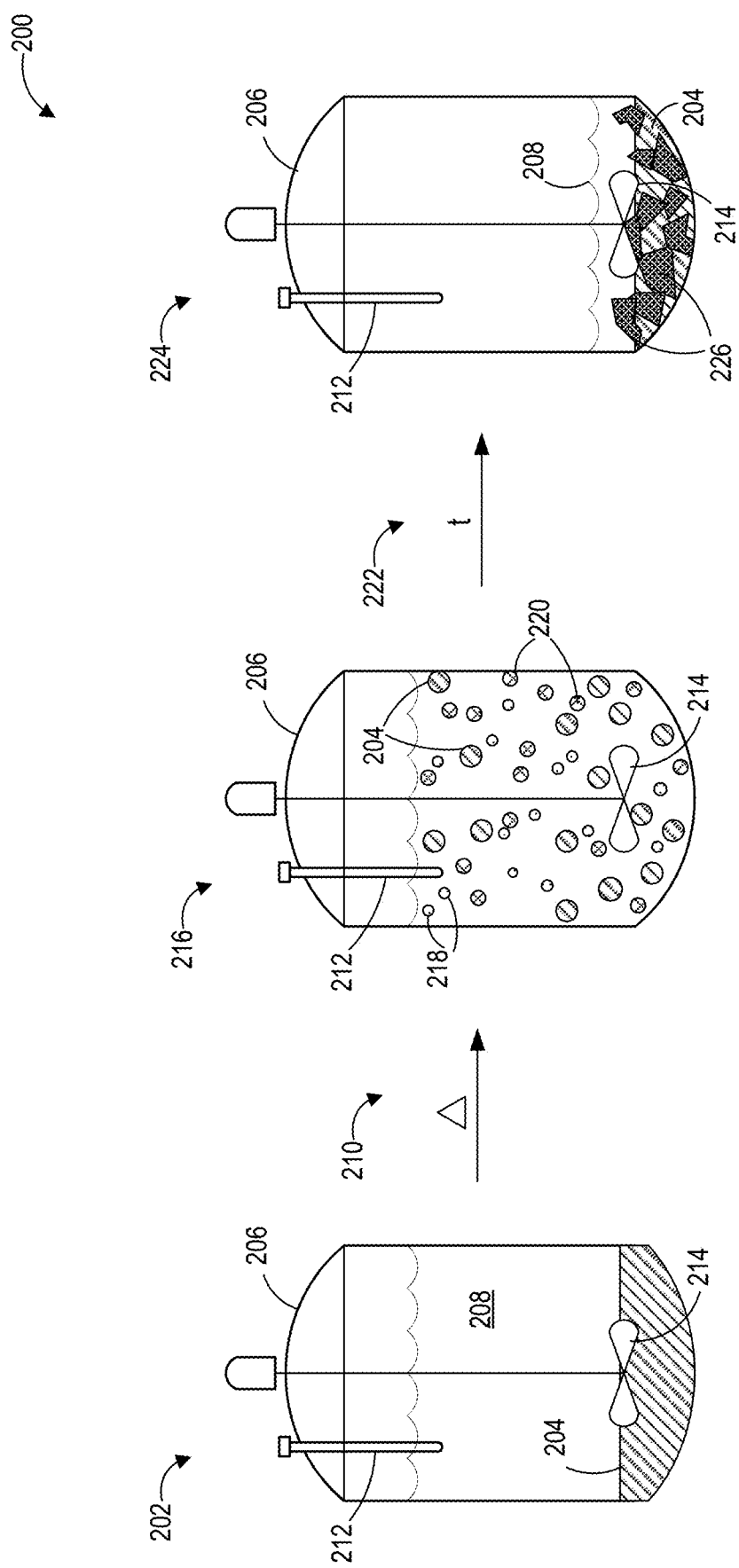
FIG. 2 shows an example of a process for treating contaminated environmental media with a salt precursor of the mineral of FIG. 1.

The following description relates to systems and methods for treating an environmental medium contaminated with both water-soluble materials, mineral phases, and/or inner-sphere sorption phases forming complexes with soil. The contaminated environmental medium may be treated by promoting transformation of a mineral from the medium, the mineral incorporating ions from the contaminant materials into its structure and thereby reducing a mobility and bioavailability of the contaminant ions. In one example, the mineral may have a structure based on jarosite, with a base unit formed of iron cations and sulfate anions. As shown in FIG. 1, the iron and sulfate constituents of the mineral may be at least partially substituted by the contaminant ions upon treatment by a jarosite-group mineral formation process. The process is illustrated in FIG. 2 and described in a flowchart in FIG. 3. Additionally, treatment of soil with the jarosite-site group mineral may be achieved at a contaminated site, e.g., in situ, with reduced energy demands by seeding a reaction using potassium-jarosite (K-jarosite). The reaction is summarized in FIG. 4 and a process for promoting formation of the contaminant ion-substituted jarosite-group mineral via K-jarosite is depicted in FIG. 5. Results and experimental data related to soil remediation using the reaction with K-jarosite are shown in FIGS. 6-9, including micro-X-ray fluorescence elemental maps, and graphs depicting plumbojarosite yield and changes in bioaccessibility for different soil samples.

Environmental media at locations used previously or currently for various commercial or recreational applications, such as Superfund sites, residential yards, agricultural land, industrial plants, etc., may be subject to various byproducts of chemical processes that leads to infiltration of undesirable materials such as heavy metals, toxic elements, radioactive compounds, etc. The environmental media may include soils, sediments, and water, which may be challenging to decontaminate efficiently. For example, remedial processes to neutralize biologically and/or ecologically harmful effects of the contaminants may include replacement of the environmental media, or use of various adsorptive and/or chemical techniques to reduce a mobility and bioavailability of the contaminants. As an example, contamination of waterways with lead (Pb) cations may lead to health issues impacting entire communities. Current methods for treating lead contamination exhibit inconsistent and poor outcomes and therefore more robust remedial strategies are demanded.

In one example, a mobility and bioavailability of one or more contaminant ions may be minimized in an environmental medium by treating the medium with a plumbojarosite precursor to form a naturally occurring mineral. Anionic and cationic sites in the mineral may be substituted by the contaminant ions, thereby sequestering the contaminant ions into a structure of the mineral. In some examples, the substitution may be irreversible or at least nearly irreversible under ambient conditions, reducing the mobility and bioavailability by greater than 99%. The resulting substituted mineral may be resistant to changes in pH, organic matter content, temperature, and pressure, and may be nearly insoluble in aqueous solutions, therefore enabling irreversible precipitation of contaminant ions. Thus, even when ingested by the organism, a likelihood of dissolution of the substitute mineral is low, with the contaminant ions tightly bonded within a refractory material that is passed through the organism.

As an example, the plumbojarosite precursor may be K-jarosite, where the K-jarosite is a jarosite-group mineral incorporating K cations, and the mineral may be a jarosite derivative, e.g., have a structure analogous to jarosite, such as plumbojarosite. Although use of plumbojarosite is described herein as an exemplary mineral, other jarosite-group minerals may also demonstrate effective sequestration of contaminant ions, such as sodium-jarosite (natrojarosite). Plumbojarosite is an insoluble lead/iron-hydroxysulfate mineral belong to the alunite supergroup of jarosite-group minerals. However, formation of other mineral types within the alunite supergroup may be possible for sequestering the contaminant ions. For example, alunite may form if aluminum concentration is high, beudantite may form when the environmental medium is contaminated with both lead and arsenic, crandallite may form with addition of phosphate, and formation of florencite, although rarely found in nature, may be possible. However, the jarosite-group minerals may be a most efficient option as their formation may occur even at ambient temperature, albeit slowly.

Alternatively, the plumbojarosite precursor may be a salt, such as iron sulfate. When heated to above 80° C. to facilitate a formation reaction and to reduce secondary impurities, the jarosite-group minerals may be formed from a solution of iron sulfate, producing a compound with a trigonal crystal structure. Jarosite has a repeating unit of $Fe^{3+}_3(SO_4)_2(OH)_6$ and iron cations ($Fe^{3+}$) may be substituted with other cations while sulfate anions ($SO_4^{2-}$) may be substituted with other anions.

An example of a single unit of jarosite is shown in FIG. 1 by a first chemical structure 100. Other cations, e.g., $X^{n+}$, may at least partially replace the iron cations and other anions e.g., $Y^{m-}$, may at least partially replace the sulfate anions to form a second chemical structure 150, as depicted in FIG. 1. As such, formation of jarosite-group minerals may enable incorporation of more than one type of contaminant ion into the mineral structure, thereby expanding a capability of treatment by jarosite-group mineral formation to decontaminate environmental media. In one example, the other cations include lead cation ($Pb^{2+}$) and the other anions include arsenate ($AsO_4^{3-}$). The second chemical structure 150 may therefore have a basic unit formula such as $PbFe^{3+}_6(OH)_{12}(AsO_4SO_4)_4$, forming plumbojarosite with a low solubility in aqueous solution. It will be appreciated that the second chemical structure 150 shown in FIG. 1 is a representative depiction of one unit of a contaminant-substituted jarosite and other units may vary in composition.

In other examples, various other ions may be similarly incorporated into the jarosite structure. For example, cobalt, nickel, zinc, cadmium, mercury, tungsten, antimony, uranium, and plutonium may at least partially substitute for iron, amongst others, and sulfate may be at least partially substituted by selenite, chromate, antimonite, etc. Numerous, e.g., at least 180, jarosite-group minerals have been identified, enabling a broad application of the remediation strategy described herein. Furthermore, jarosite-group minerals are environmentally and biologically benign materials, therefore effectively suppressing a toxicity, reactivity, mobility, bioavailability, and transport of contaminant ions when formed.

The contaminant ions may be incorporated into a matrix such as a jarosite-group mineral structure during a formation process of the mineral from the salt precursor. The formation process may include treating a mixture formed of the salt precursor and a contaminated environmental medium (e.g., soil, sediment, water, etc.) with water and heat such that contaminants of the environmental medium are converted to their native ionic phases or species to allow substitution of the salt precursor ions by the contaminant ions. An example of a formation process 200 of contaminant-substituted jarosite is illustrated in FIG. 2 by a flow diagram. The formation process is also described by an example of a method 300 for sequestering contaminant ions from environmental media depicted in FIG. 3 and will be discussed in conjunction with the flow diagram of FIG. 2 to elaborate on details of the process and method.

At 302 of method 300, and shown at a first step 202 of the formation process 200 of FIG. 2, a contaminated environmental medium 204 is selected and prepared. For example, selecting the contaminated environmental medium may include identifying a site where levels of contaminants are measured to be above threshold levels, e.g., by laboratory-based soil testing. The threshold levels may be predetermined quantities of the contaminants above which the contaminants are known to have negative effects on organisms and/or a local ecology, as an example. The contaminants, as described above, may include lead, arsenic, and various other elements and compounds.

As shown in FIG. 2, preparing the contaminated environmental medium 204 includes adding the contaminated environmental medium 204 to a batch reactor 206. In one example, the contaminated environmental medium 204 is soil 204 which may be removed from a contaminated site, such as a residential yard. For example, an upper layer of soil from the site, a depth of the upper layer of soil corresponding to a maximum penetration of the contaminants downwards from a surface of the soil, may be extracted and transported from the site to reactor site. The reactor site may be located within close proximity of the soil site, for example, or may be located at a distance demanding travel by a vehicle, such as a truck, to reach the reactor site. The soil 204 may be stored in the batch reactor 206 with water 208. By adding water 208 to the batch reactor 206, water-soluble contaminant compounds in the soil may dissolve to form ions in solution.

At 304 of method 300, the contaminated soil is treated to drive conversion of the contaminant compounds from an ionic phase to a mineral phase. For example, treating the contaminated soil may include heating a mixture, or slurry, formed of the soil, contaminant ions, and water at 306. As shown at a second step 210 of FIG. 2, the batch reactor 206 may be heated by a variety of methods discussed further below, with reference to Table 1. A temperature of the water 208 in the batch reactor 206 may be monitored by, for example, a thermometer or thermocouple 212 and even heat distribution through the water 208 may be enabled by activation of a stirrer 214. The batch reactor 206 may be heated, in one example, to a temperature greater than 80° C. and less than 110° C.

Treating the contaminated soil may also include adding a salt at 308 of method 300. In one example, the salt is iron sulfate. The iron sulfate may be added as a solid or as a solution. For example, the iron sulfate may be dissolved in water before addition or may added in the solid state to be dissolved in the batch reactor 206, as shown in a third step 216 of FIG. 2. The iron sulfate dissolves to produce iron cations 218 and sulfate anions 220. It will be noted that the dissolved contaminant ions are not shown in the batch reactor 206 in the third step 216 for clarity. In some examples, sulfuric acid ($H_2SO_4$) may be added to the batch reactor 206 during the third step 216 to increase a sulfate concentration of the mixture which may drive formation of a jarosite-group mineral, such as plumbojarosite.

Heating and stirring of the mixture may continue for a threshold period of time, as indicated at a fourth step 222 of FIG. 2 and at 309 of method 300. For example, the threshold period of time may be a temperature-dependent duration of time for a reaction resulting in the formation of the jarosite-group mineral to be complete. The reaction may be complete when, for example, greater than 95% of the contaminant ions are incorporated into the jarosite-group mineral structure. As an example, the threshold period of time may be between 5-12 hours, where the threshold period of time decreases as temperature increases.

Figure 3:
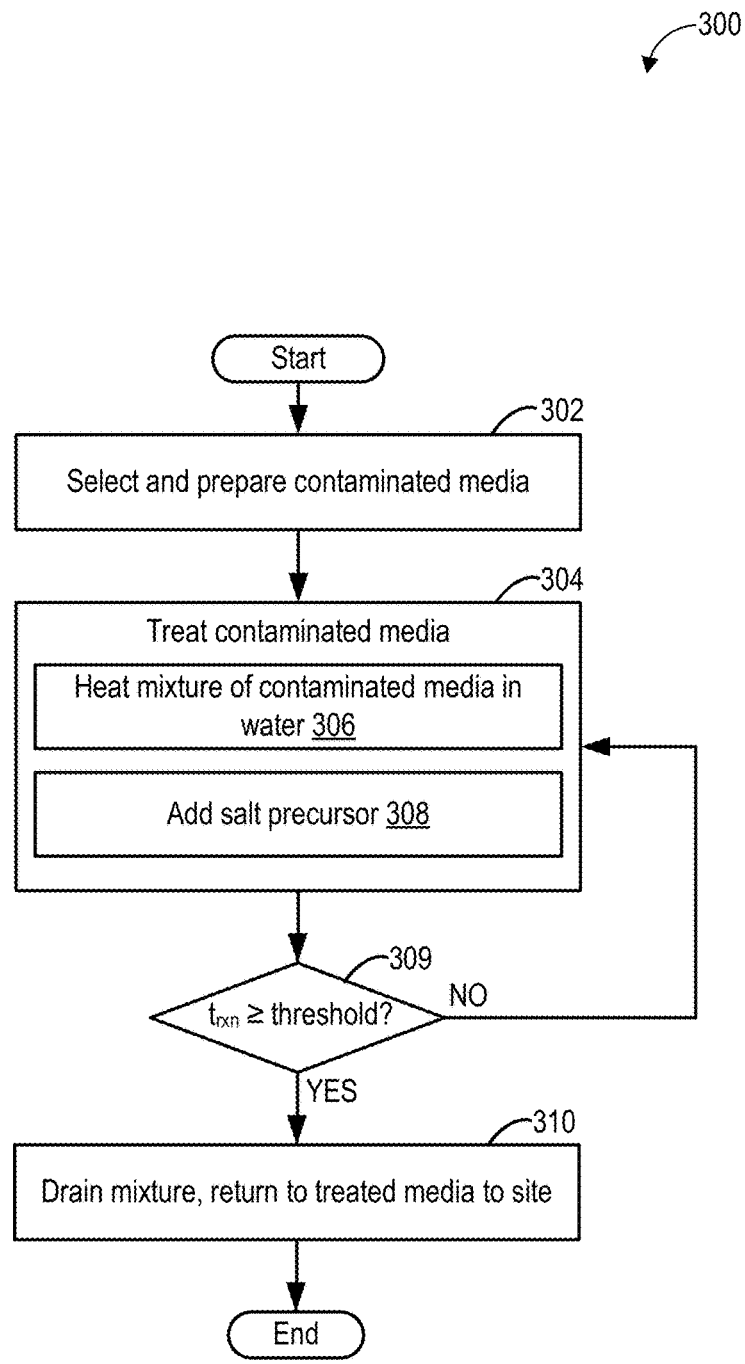
FIG. 3 shows an example of a method for treating contaminated environmental media by incorporating contaminant ions into a mineral matrix.

At 309 of FIG. 3, method 300 includes determining if an amount of time elapsed since a start of the reaction, e.g., a reaction time of the formation process, is at least equal to the threshold period of time. If the time elapsed is less than the threshold period of time, the method returns to 304 to continue treating the contaminated environmental medium via heating and stirring the medium with the salt solution. If the time elapsed is at least equal to the threshold period of time, the method continues to 310 to drain the mixture and return the treated environmental medium to the original site. For example, as shown as a fifth step 224 of FIG. 2, the reaction may be complete and a jarosite-group mineral structure 226 is formed. The water 208 may be drained, e.g., through a drainage port of the batch reactor 206, and a remaining sediment, formed of the soil 204 and the jarosite-group mineral structure 226 may be removed from the batch reactor 206 and transported back to the original site. The method ends.

In other examples, however, the formation process may be conducted in situ, at the contaminated site. In such instances, the salt may be similarly added as a solid or as a salt solution directly to the soil surface. A heat or steam-generating apparatus may be applied at the soil surface to simultaneously heat the soil and provide water for the reaction, e.g., to facilitate dissolution of the salt and the contaminants. Alternatively, the salt solution may be delivered by direct steam injection into the contaminated soil. The in situ techniques described above, however may demonstrate lower effectiveness than treatment by batch reactor due to heating contact time demands and size constraints of apparatuses used to execute in situ treatment.

Reaction parameters for ion sequestration in an environmental matrix, e.g., a structure of a naturally-occurring mineral such as a jarosite-group mineral, are shown in below in Table 1.

TABLE 1

Reaction parameters for contaminant ion sequestration in a jarosite-based mineral matrix.

| Property/condition | Example Range | Extreme range |
|---|---|---|
| Contaminant media | Soil, sediment, water | Waste, radioactive waste |
| Solid:Solution ratio | 1-100 grams/liter | Up to 350 grams/liter |
| Contaminant concentration | Soil cleanup level to 250x soil cleanup level (mg/kg) | 0 to 1000x soil cleanup level (mg/kg) |
| Target contaminants | Cations: Pb, Co, Ni, Cu, Zn, Cd Anions: As, V, Cr, Se, Sn, Sb, W | Radionuclides: Ce, Th, U, Pu |
| Salt/salt solution | Iron (III) sulfate hydrate [$Fe_2(SO_4)_3$] | Iron (II) sulfate hydrate [$FeSO_4$] |
| Concentration of salt/salt solution | 0.01 to 1M (0.1M optimal) | 1-10M |
| Additive chemical | 0.0001 to 1M $H_2SO_4$ | 1 to 10M $H_2SO_4$ |
| Time | 5 to 12 hours | 1 to 72 hours |

TABLE 1-continued

Reaction parameters for contaminant ion sequestration in a jarosite-based mineral matrix.

| Property/condition | Example Range | Extreme range |
| --- | --- | --- |
| Heat | >80° C. to <110° C. | >20° C. to <999° C. |
| Heat source | Direct heat source, e.g., direct heating systems, infrared, steam, solar | Alternative heating methods, e.g., microwave, electrical resistivity |

Optimal and extended ranges are depicted for various properties and conditions in Table 1, where the extended ranges are expanded ranges relative to the optimal ranges for a specific parameter. For example, the jarosite-group mineral formation process may primarily be applied to contaminated environmental media such as soil, sediment, and water but may also be used to treat waste materials and radioactive waste. A solid to solution ratio, e.g., an amount of an environmental medium relative to a volume of solution such as water, may be between 1 to 100 grams/liter and as much as 350 grams/liter, in some instances. Increasing the ratio to 400 grams/liter or greater, however, may impede sufficient mixing and suspension of the mixture.

A preferred range for contaminant concentration may include up to a soil cleanup level up to 250 times the soil cleanup level but may be extended from 0 times the soil cleanup level up to 1000 times the soil cleanup level. The soil cleanup level may be a predetermined maximum allowable level of a contaminant in a specific site. For example, a soil cleanup level for lead in residential settings may be 400 mg/kg. Target contaminant species may include heavy metals and elements associated with high toxicity but may also encompass radioactive elements, in some examples.

While iron (III) sulfate hydrate may be used as a salt precursor to jarosite with minimal preparation and/or processing, iron (II) sulfate may also be used which demands an additional oxidation step prior to use. Use of both salts may inherently include intentional additive compounds or impurities such as lithium, sodium, potassium, magnesium, calcium, manganese, silicon, nitrogen, phosphorous, etc. By adding an additive chemical such as sulfuric acid, a pH of the reaction mixture may be reduced and more sulfate may be introduced, driving a forward direction of the jarosite-group mineral formation reaction. As alternatives to sulfuric acid, other sulfate salts may be added instead to increase sulfate concentration, including lithium, sodium, potassium, manganese, and calcium sulfates.

With respect to a duration of time for reaction completion, the preferred range may be between 5 to 12 hours. In some examples, full conversion may occur as fast as one hour but 8 hours may provide a highest likelihood of completion. As such, the extended range for reaction completion may be between 1 and 72 hours, where longer reaction times may correspond to lower reaction temperature. The reaction temperature may be between 80° C. and 110° C. due to a tendency for lead sulfate to form below 80° C. which has lower stability than plumbojarosite as well as higher bioavailability. In particular, when lead concentration is high, a likelihood of lead sulfate formation may be elevated. Furthermore, above 110° C., water may boil and evaporate and reduce contact between reaction species although loss of water may be offset by implementation of a pressure system. The pressure system may allow heating at elevated temperatures, such as between 110° C. and 999° C. without loss of solution, therefore favoring plumbojarosite formation and decreasing reaction time. Reaction time may also be decreased by using microwave heating to drive contaminant ion-substituted jarosite.

In some instances, treating contaminated media at a preferred temperature range between 80° C. and 110° C. may demand undesirable energy consumption in order to promote sufficient reaction efficiency. For example, heating a reaction in situ, e.g., at a contaminated site may include energy intensive application of a heating device as well as transporting the heating device to and from the site. Similarly, expediting reaction time by using a pressure system, as described above, may also demand burdensome transport of the pressure system and high energy consumption.

As such, a remedial strategy for treating contaminated media in a low cost manner with reduced energy demands may include leveraging a lability of a jarosite isomorph incorporating potassium ions. The jarosite isomorph, e.g., K-jarosite, may be used as a plumbojarosite precursor instead of a salt, as described above. K-jarosite may include both iron and potassium cations in its crystal structure. The potassium cations, however, are more easily substituted by contaminant cations, such as lead cations and other cations as described previously. The K-jarosite, when added to an aqueous suspension of contaminated media, may therefore have a seeding effect that promotes plumbojarosite formation, which may also include sequestering of contaminant anions into a structure of the plumbojarosite. As a result, less input of heat is demanded to facilitate effective sequestration of contaminant ions, allowing the remedial strategy to be more field applicable and less energy-intensive than remediation relying on heating of a slurry of the contaminated media and a salt.

Figure 4:
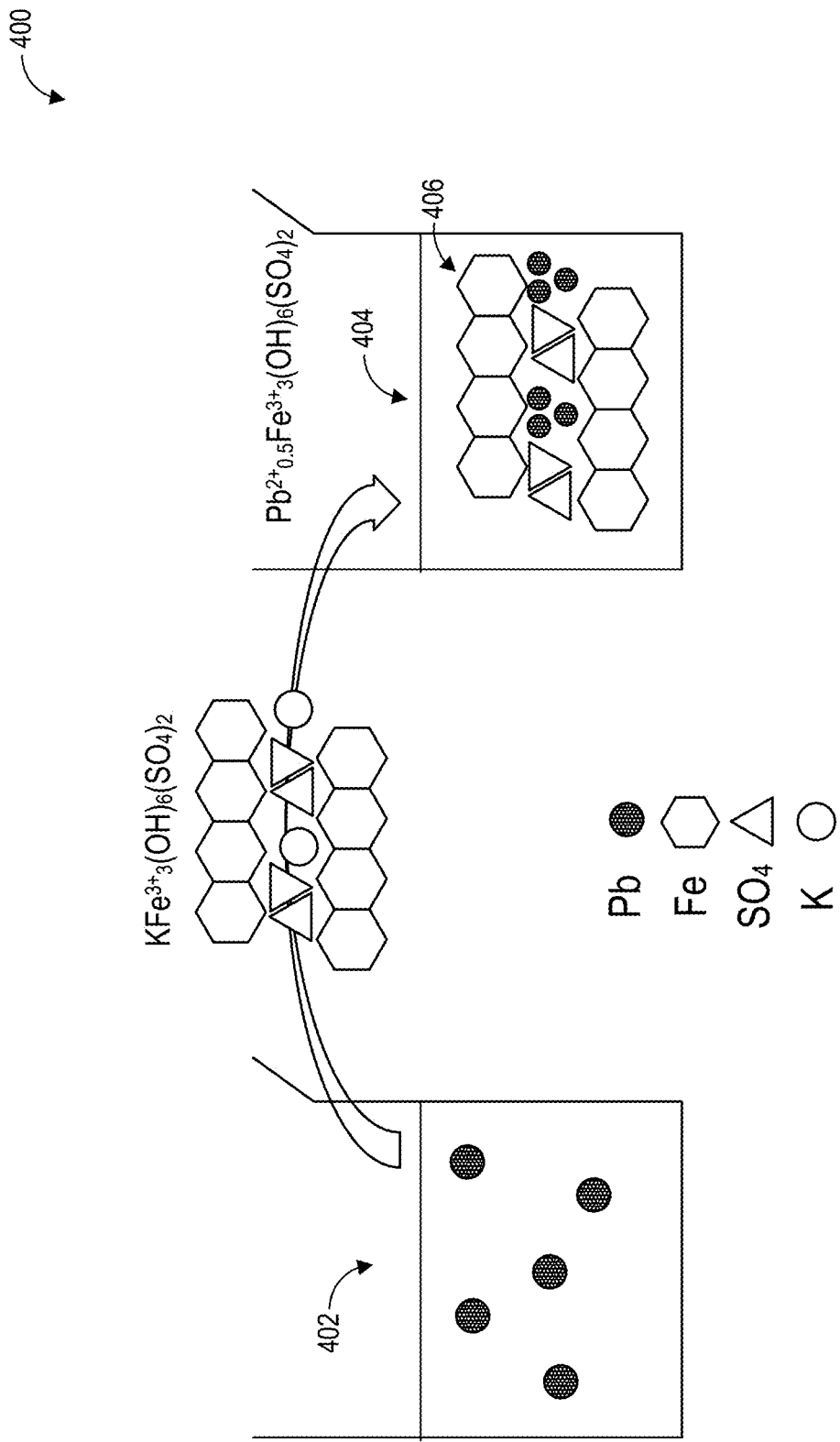
FIG. 4 shows an example of a process for incorporating contaminant ions into a mineral matrix using potassium-jarosite.
Figure 5:
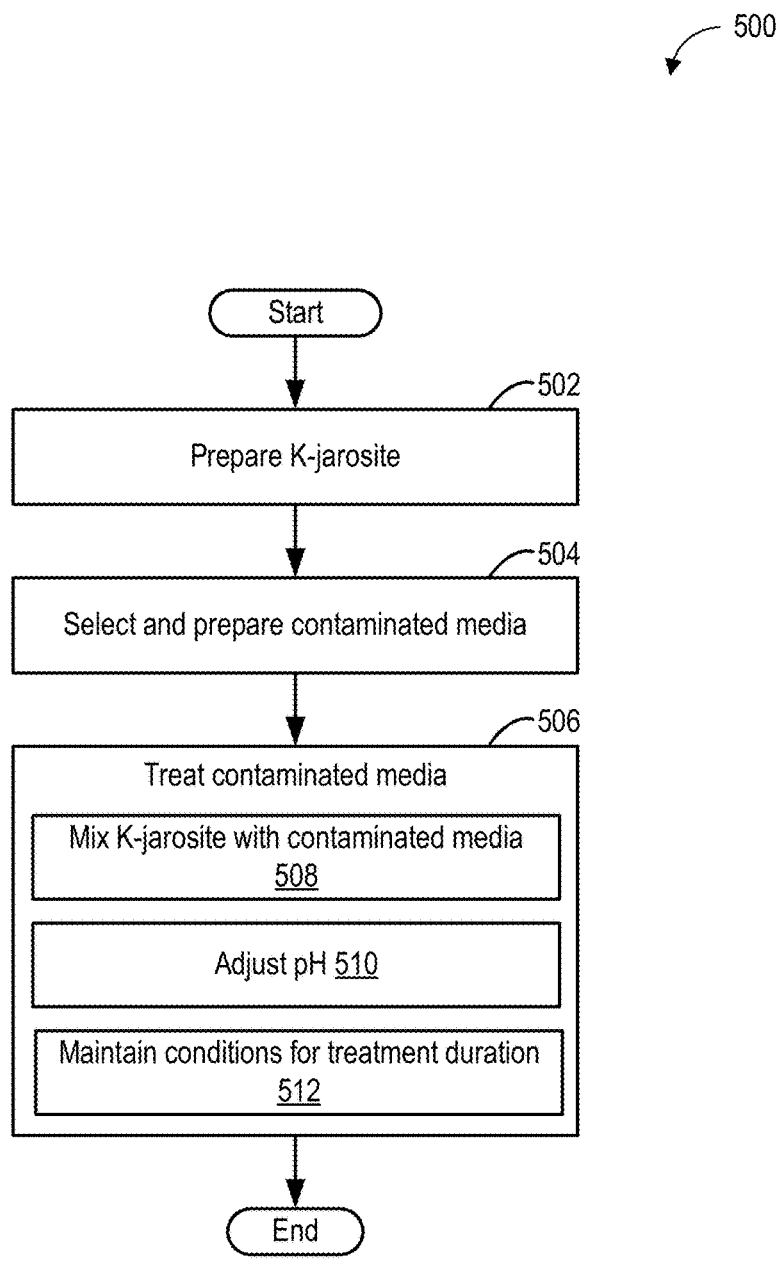
FIG. 5 shows an example of a method for treating contaminated environmental media using potassium-jarosite.

For example, a reaction scheme 400 of the remediation strategy using K-jarosite is depicted in FIG. 4. States of reactants in reaction scheme 400 are illustrative of experimental conditions and actual reactant states, when applied in field conditions, may vary from those shown. The reaction scheme 400 may include adding pre-synthesized K-jarosite to a suspension 402 of the contaminated media at ambient temperature to form a wet mixture 404 and a pH of the wet mixture 404 may be decreased to an acidic level. The wet mixture 404 may be mixed, e.g., mechanically or by diffusion in a saturated state, over a duration of time to allow ion substitution and plumbojarosite formation to occur. During mixing, the wet mixture 404 may be maintained at ambient temperature or heated, where heating the wet mixture includes heating to a lower temperature than temperatures used in remediation strategies relying on heat and addition of a salt to precipitate plumbojarosite. Ion substitution may include cation exchange of potassium for contaminant cations at potassium sites of the jarosite crystal structure. Substitution of the potassium cations with, for example, lead cations, promotes crystallization of plumbojarosite 406 in the wet mixture 404. Further details of the remediation strategy are described with reference to FIG. 5.

Turning now to FIG. 5, a method 500 for treating contaminated media using K-jarosite as a basis for cation exchange and seeding of plumbojarosite crystallization is depicted. The method 500 may be implemented either ex situ, where the contaminated media is removed from a contaminated site and treated at a facility, or in situ, where the contaminated media is treated at the contamination site. Execution of method 500 in situ may be advantageous over in situ application of strategies relying on elevated reaction temperatures, such as described above with reference to method 300 of FIG. 3. For example, as method 500 may be conducted without heat input, transport of comparatively less equipment is demanded and reduced energy consumption is enabled by application of method 500.

At 502, method 500 includes preparing the K-jarosite. Preparing the K-jarosite may include synthesizing the K-jarosite by, for example, adding a potassium source to a heated aqueous solution of iron sulfate. As one example, 17.2 g of ferric sulfate hydrate ($Fe_2(SO_4)_3 \cdot nH_2O$) and 5.6 g of potassium hydroxide (KOH) may be dissolved in 100 mL of deionized water. The solution may be stirred while heating the solution to a moderate boil at 95-100° C. for 4 hours, during which a solid mineral may precipitate. The mineral may be allowed to settle after 4 hours by terminating heating and stirring. A liquid portion may be decanted and the remaining precipitated mineral may be washed with deionized water and centrifuged to separate the mineral from residual water. The mineral may be dried in an oven at 110° C. for 24 hours and then weighed and characterized by X-ray diffraction to confirm formation of K-jarosite. The synthesis of K-jarosite, as described above, may be scaled up to increase an amount of K-jarosite formed. For example, the protocol may be scaled up threefold while maintaining a similar yield of K-jarosite. Alternatively, the K-jarosite may be obtained from a commercially available source. The K-jarosite may be further prepared by hydrating the K-jarosite in water.

Contaminated media is selected and prepared at 504 of method 500. As an example, selecting the contaminated environmental medium may include identifying a site where levels of contaminants are measured to be above threshold levels, e.g., by laboratory-based soil testing. The threshold levels may be predetermined quantities of the contaminants above which the contaminants are known to have negative effects on organisms and/or a local ecology, as an example. The contaminants, as described above, may include lead, arsenic, and various other elements and compounds. In some examples, the contaminated media may be soil from a contaminated site and preparation of the contaminated media may include adding the soil to a batch reactor as described above with reference to FIG. 2.

In other instances, the contaminated media may be prepared in situ by adding water directly to the contaminated media at the contaminated site. For example, when the contaminated media is soil, a top layer of the soil, such as an upper 3 to 6 inches, may be wetted with water and brought to field capacity, where field capacity is water remaining in the soil after thorough saturation for 24 to 48 hours at moderate temperatures. Preparing the soil in situ may further include mechanically mixing the top layer, such as by tilling, with or without heating. For example, the mixing may be conducted at temperatures between ambient temperature up to 80° C. Selection of a temperature for heating the soil during mixing may be determined based on climate conditions and existing soil chemistry of the contaminated site. The mixing temperature may be controlled using, for example, soil heating blankets, corrosion-resistant metallic heating rods, or other soil heating techniques. Additionally, leveraging of natural heat sources, e.g., heating by the sun, may be applied to heating to the soil by tightly covering the soil with black tarp or another type of dark material to maximize heating via exposure to the sun, as an example. Natural heating conditions may be particularly efficient during summer conditions to achieve desirable soil reactions temperatures.

At 506, method 500 includes treating the contaminated media, e.g., the soil. Treating the soil may include mixing the wetted soil with the K-jarosite at 508 to form a wet mixture. The wet mixture may be maintained at saturation with water over a reaction duration. For example, an amount of the K-jarosite mixed with the soil may correspond to a ratio of 30:1 of soil:K-jarosite by mass. The K-jarosite may be added either suspended in water or as a ferric sulfate/sulfuric acid solution. When added as the ferric sulfate/sulfuric acid solution, the soil:K-jarosite ratio may be increased beyond 30:1, thereby decreasing a mass of K-jarosite demanded to meet a desired soil-K-jarosite ratio, relative to suspension of the K-jarosite in water. Treating the contaminated media may also include adjusting the pH of the soil/K-jarosite mixture at 510. More specifically, the pH may be adjusted to an acidic pH. As one example, when the K-jarosite is added to the soil as the ferric sulfate/sulfuric acid solution, the pH may be adjusted concurrent with addition of the K-jarosite to the soil. The ferric sulfate/sulfuric acid solution may have a ferric sulfate concentration of 0.1 M and a sulfuric acid concentration of 0.01 M, as one example, to decrease the soil pH to approximately 2.5. In other examples, the concentrations of the ferric sulfate/sulfuric acid solution may be up to 0.5 M ferric sulfate and 0.05 M sulfuric examples. In another example, the pH may be lowered to below 3, or between 2 and 3. The concentrations of the ferric sulfate and sulfuric acid may be varied, e.g., increased or decreased, respectively, depending on the existing soil chemistry.

As another example, when the K-jarosite is added to the soil as the suspension in water, the pH may be adjusted by adding an acid that does not include sulfate. For example, 0.1 M hydrochloric acid, nitric acid, or another acid without sulfate, may be used to lower the pH of the soil to one of approximately 2.5, below 3, or between 2 and 3. At 512, treating the contaminated media may further include maintaining the treatment conditions, e.g., as described at 508 and 510, for a duration of time. The duration of time may be a pre-determined duration of time, such as up to one week. In one example, when heat is applied during mixing at 504, the heat source may be maintained active for at least a portion of the duration of time and removed after a maximum of 16 hours of treatment. As another example, maintaining the treatment conditions may include maintaining the soil pH at the selected acid pH over the duration of time. In yet another example, maintaining the treatment conditions may include maintaining the soil in a state of saturation (e.g., with water), to ensure diffusion of ions through the soil over the duration of time. As such, maintaining the treatment conditions may include actively maintaining one or more of the conditions described above. For example, heat may be applied to the soil for up to 16 hours while maintaining the pH acidic and adding water as demanded for saturation of the soil. An another example, the soil may not be heated and the pH may be maintained at 2.5 and the soil saturated over a duration of one week. Conversion of a large fraction (at least 65%) of contaminant ions in the contaminated soil to plumbojarosite may be achieved within one week but conversion may continue over several months after initial treatment, particularly after rain events. In some instances, 100% conversion of the contaminants ions to plumbojarosite may be observed within one week. In some examples, the treatment (e.g., addition of K-jarosite) may be repeated according to an extent of contamination of the soil or to soil chemistry that is less favorable for plumbojarosite formation.

In this way, contaminated media may be treated via cation substitution with pre-synthesized K-jarosite to sequester contaminant ions into plumbojarosite. For example, bioavailability of lead in soil may be reduced by up to 80% as a result of potassium substitution in the K-jarosite structure by lead. Sufficient substitution may occur at temperatures lower than those used to precipitate plumbojarosite solely by heat (e.g., without seeding with K-jarosite), over a relatively short period of time (e.g., 8 hours up to one week). Treatment of the contaminated media using K-jarosite may be achieved at ambient temperature, thereby demanding less energy input than the heat-based treatment to precipitate plumbojarosite. Overall, contaminant materials that form ions in aqueous solution may be converted to a nontoxic, environmentally benign phase by incorporating the ions into the structure of a jarosite-group mineral. The jarosite-group mineral may further sequester more than one type of ion, including ions derived from materials associated with high toxicity, adverse ecological/environmental effects, and radioactive properties. As such, remediation efficiency may be increased for sites contaminated with a variety of materials by application of a single process.

Experimental Details and Results
Ion Exchange Tests with K-Jarosite

Reaction of K-jarosite with aqueous lead (as lead nitrate, $Pb(NO_3)_2$) was determined by hydrating 2 g of synthesized K-jarosite in 125 mL polypropylene vessels with 45 mL of deionized (DI) water. After hydrating for 1 hour, 5 mL of a 0.03 M Pb stock solution was added to each vessel and the pH adjusted to 2.5 using hydrochloric acid (HCl). The vessels were mixed on a rotary mixer at 30 rpm with samples collected at 8 hours, 24 hours, 1 week, and 1 month. Solid phases were isolated from each sample, washed with DI water and freeze-dried.

Ion exchange in K-jarosite and lead-contaminated soils was also studied based on a first soil specimen contaminated with a Pb-based pesticide (Barber Orchard). In the first soil specimen, contaminant Pb was predominantly found as phases sorbed to iron, clays, and/or organic matter in the soil. The soil was dried at room temperature for two days, sieved to a less than 250 µm size fraction, and 2 grams of the sieved soil was added to 2 grams of K-jarosite, after hydration of the K-jarosite in 50 mL DI water. The pH was adjusted to 2.5±0.25 with HCl and mixed on the rotary mixer at 30 rpm for approximately one week. Over the weeklong duration, the pH was monitored and adjusted to maintain the pH at 2.5±0.25. The solids were isolated by centrifugation at the end of the reaction period, washed with DI water, frozen at −20° C., freeze-dried and stored in a desiccator. The Barber Orchard soil was also reacted with plumbojarosite (PLJ) via heat treatment and addition of a salt, as described above.

Figure 6:
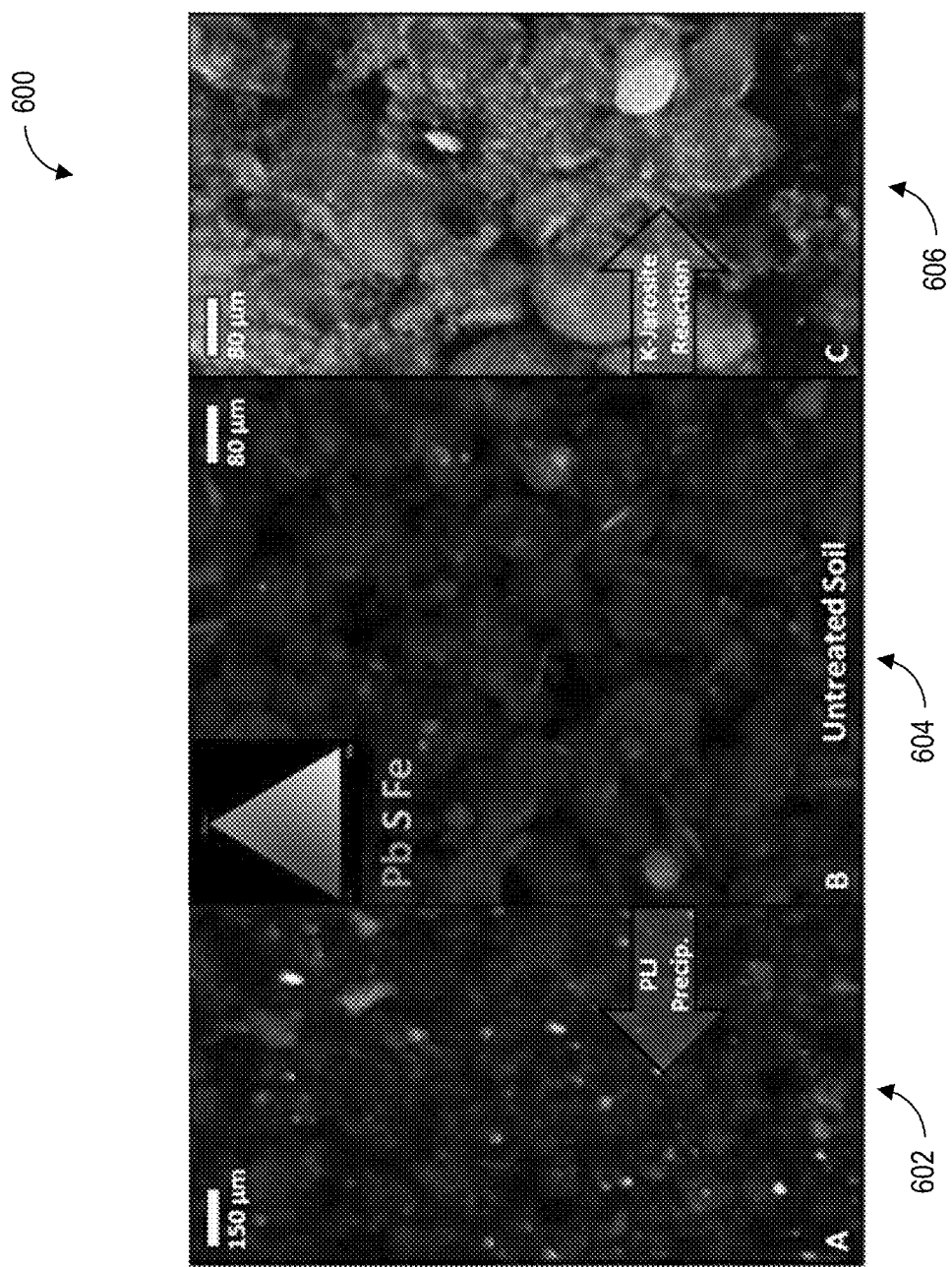
FIG. 6 shows micro-X-ray fluorescence elemental mapping comparing images of untreated soil, soil treated with heat, and soil treated with potassium-jarosite.

The samples were analyzed by micro-X-ray fluorescence (µ-XRF) elemental mapping at 13500 eV using a Si(111) φ=90 double crystal monochromator with 5 micron resolution. An example of a µ-XRF image 600 is shown in FIG. 6, including a first panel 602, a second panel 604, and a third panel 606. The first panel 602 depicts BO soil treated with heat, the second panel 604 shows untreated BO soil, and the third panel 606 represents BO soil treated with K-jarosite at ambient temperature. The BO soil in the second panel 604 (untreated soil) includes regions abundant in iron (indicated by regions of blue) with no sulfur (indicated by regions of green), confirming an absence of lead sulfate minerals prior to treatment. Interaction of lead (indicated by regions of red) with iron without strong co-association was observed.

In contrast, the K-jarosite-treated BO soil in the third panel 606 depicts high co-association of sulfur and iron (indicated by regions of cyan) for many particles. At least a portion of the particles are also associated with regions with lead and iron interactions (indicated by regions of purple and magenta) which may be representative of PLJ phases. The heat-treated BO soil of the first panel 602 shows similar lead co-associations as the third panel 606 with some differences. For example, sulfur and lead-sulfur signatures show a higher presence which may result from exposure to aqueous sulfate, thereby increasing sulfur interactions. Furthermore, direct lead-sulfur interactions may indicate anglesite formation and a physical morphology of particles in the first panel 602 are discrete and smaller in size relative to the particles of the third panel 606.

In addition, X-ray absorption near edge structure (XANES) spectra were obtained at selected locations of the samples, based on the µ-XRF images. The XANES spectra were acquired over a 25×25 µm²-area. The results for $1^{st}$-derivative XANES linear combination fits (LCF) are shown below in Table. 2 and plotted in FIG. 1.

TABLE 2

Bulk Pb $1^{st}$-derivative XANES LCF results for all $Pb(NO_3)_2$-reacted K-jarosite, untreated Barber Orchard (BO) soil, and jarosite-treated soils.

| | | $1^{st}$ Derivative Pb XANES Spectra Linear Combination Fits | | |
|---|---|---|---|---|
| Description | Sample ID | Standard | Contribution % | R-factor |
| Lead nitrate reaction with K-jarosite | 8 hours | Plumbojarosite | 82 ± 2.4 | 0.018 |
| | | Anglesite | 18 ± 3.0 | |
| | 24 hours | Plumbojarosite | 80 ± 2.3 | 0.018 |
| | | Anglesite | 20 ± 3.8 | |
| | 1 week | Plumbojarosite | 87 ± 11 | 0.018 |
| | | Anglesite | 13 ± 2.5 | |
| | 1 month | Plumbojarosite | 65 ± 8.1 | 0.016 |
| | | Anglesite | 35 ± 2.5 | |
| Soil Pb reaction with K-jarosite | Barber Orchard (Untreated) | Pb adsorbed to Fe | 67 ± 2.7 | 0.001 |
| | | Pb adsorbed to clay | 20 ± 2.7 | |
| | | Pb citrate | 13 ± 3.7 | |

TABLE 2-continued

Bulk Pb 1$^{st}$-derivative XANES LCF results for all Pb(NO$_3$)$_2$-reacted K-jarosite, untreated Barber Orchard (BO) soil, and jarosite-treated soils.

| Description | Sample ID | 1$^{st}$ Derivative Pb XANES Spectra Linear Combination Fits | | |
|---|---|---|---|---|
| | | Standard | Contribution % | R-factor |
| | BO treated with K-Jarosite | Plumbojarosite | 100 ± 3.1 | 0.009 |
| | BO treated with heated PLJ precip. | Plumbojarosite | 100 ± 4.1 | 0.003 |

The results shown in Table 2 indicate that the reaction duration of one week produces highest yields of PLJ for all samples. The untreated BO soils demonstrate no presence of PLJ.

Figure 7:
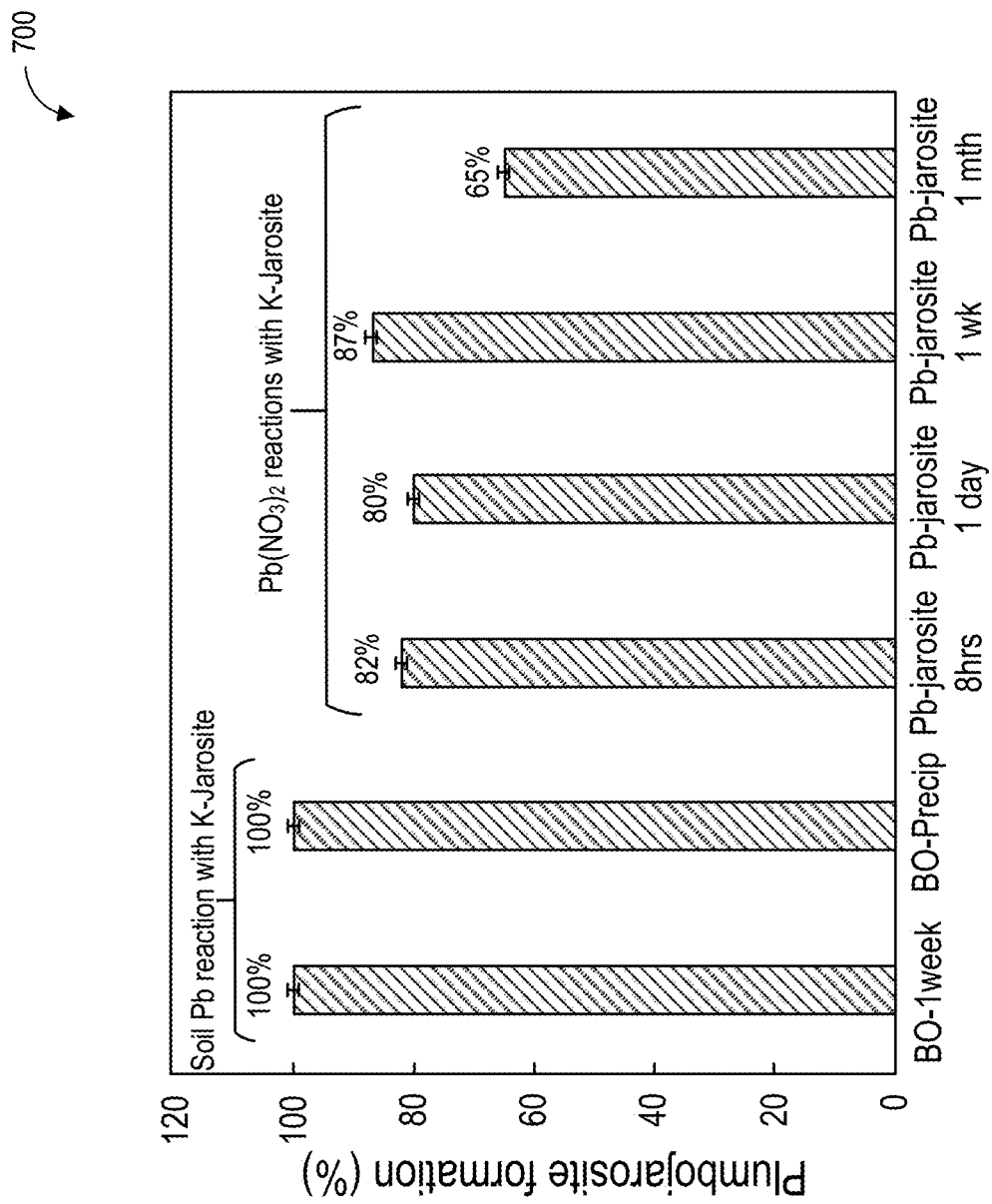
FIG. 7 shows a graph of percent plumbojarosite formation for various soil samples.

Plumbojarosite formation, according to the results of Table 2, are shown in graph 700 of FIG. 7. A percent yield of plumbojarosite for the samples described above with respect to Table 2, except for the untreated BO soil sample, is plotted for each sample. Up to 82% of PLJ was formed in the solid phases of the Pb/K-jarosite samples within 8 hours of reaction time. The weeklong reaction duration time yielded 100% PLJ from the soil samples. After one month, the PLJ yield was found to decrease, potentially due to reaction of aqueous sulfate with remaining aqueous Pb, which favors undesirable formation of anglesite (PbSO$_4$)

Bioaccessibility of Pb after K-Jarosite Treatment

A lead bioaccessibility percent (e.g., an amounted of ingested lead that is available for gut absorption after digestion) was calculated for each of the samples described above, including untreated BO soil, soil treated with K-jarosite, heat-treated soil, and K-jarosite equilibrated with aqueous lead for up to one month. The bioaccessibility percentages were determined using in vitro bioaccessibility (IVBA) assays which estimates bioaccessibility from measurements of in vitro solubility of soil lead based on gastric-phase extraction of soil in a simple extraction medium. For example, the measurements may be conducted according to EPA Method 1340, using 0.4 M glycine, pH adjustment to 1.5 using HCl, a 1:100 solid to solution ratio, with a 1 hour incubation time at 37° C. Impact estimates of soil remediation via jarosite treatment/formation on lead IVBA provides insight into how much ingested lead is absorbed into an organism's gut after digestion, which may directly affect bioavailability of the ingested lead.

Figure 8:
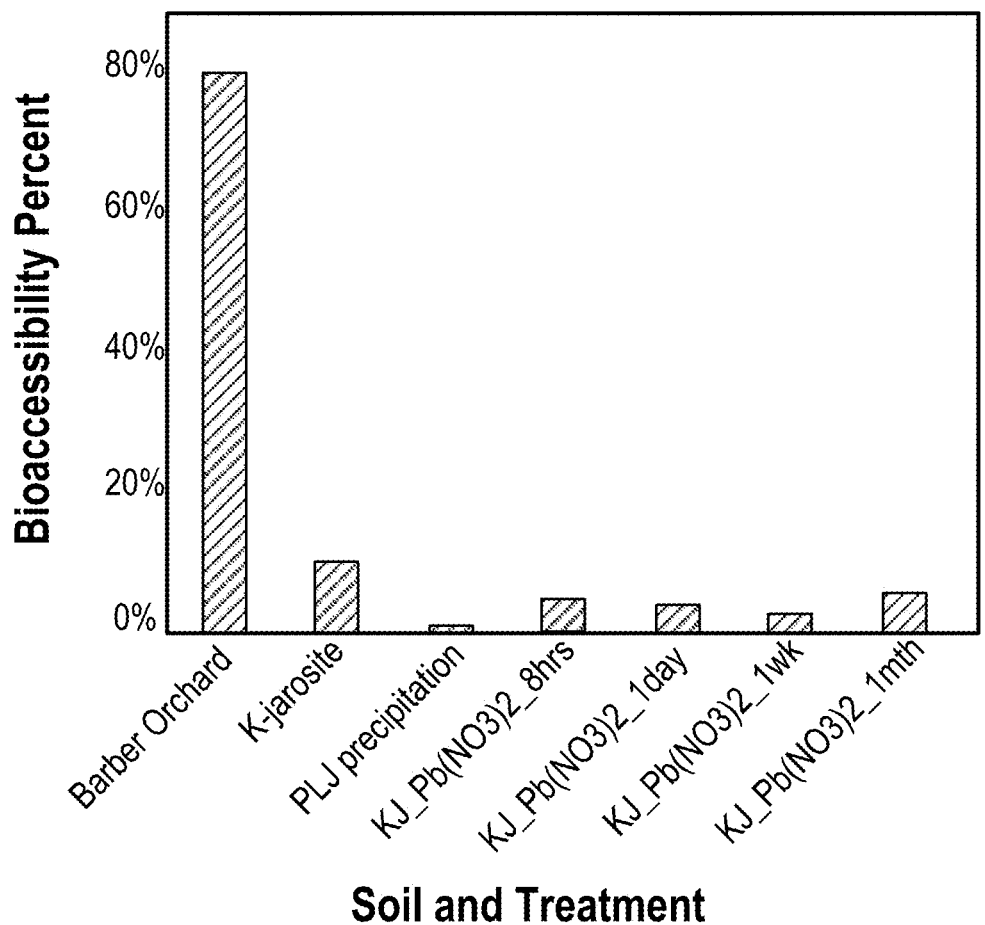
FIG. 8 shows a graph of percent bioaccessibility for the soil samples of FIG. 7.

The estimated bioaccessibility percentages are depicted in FIG. 8 in a graph 800 for the samples, where the samples include untreated BO soil (Barber Orchard), BO soil treated with K-jarosite for one week at ambient temperature (K-jarosite), BO soil treated with heat to precipitate PLJ (PLJ precipitation), and aqueous lead nitrate reacted with K-jarosite for 8 hours, one day, one week, and one month. As shown in graph 800, all of the treated soils and the aqueous lead nitrate samples demonstrate reduced bioaccessibility relative to the untreated BO soil.

Figure 9:
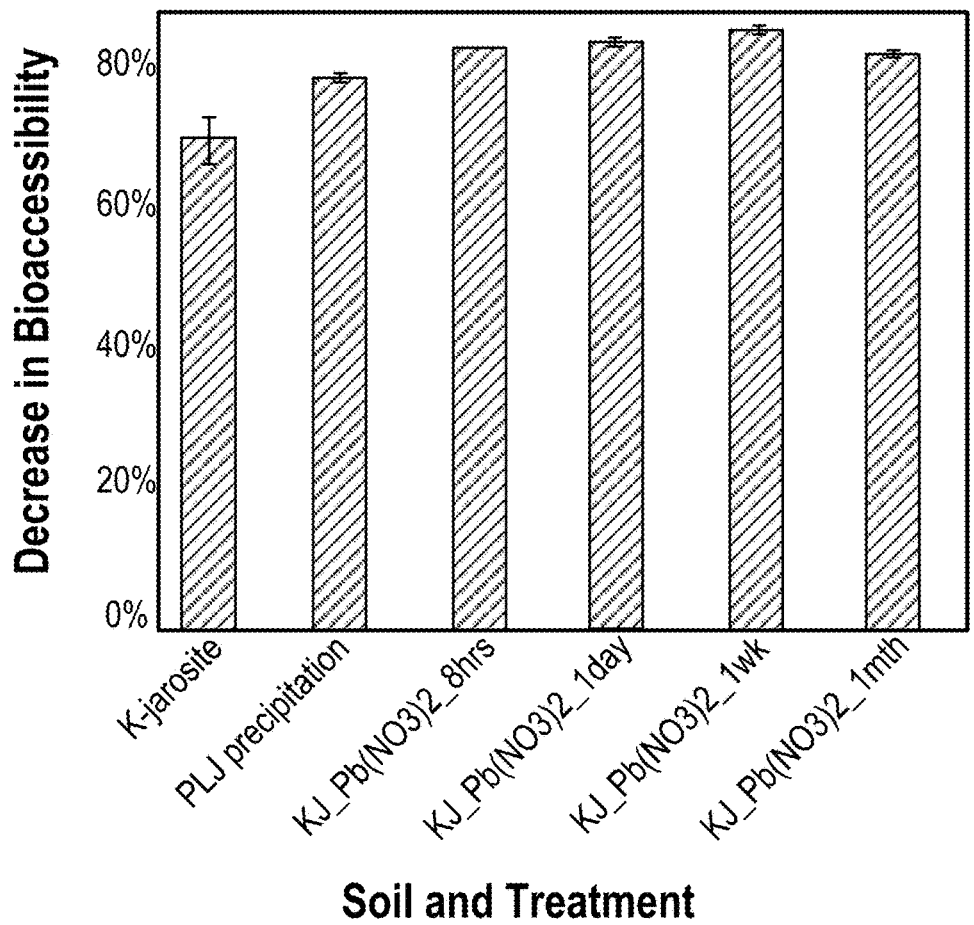
FIG. 9 shows a graph of percent decrease in bioaccessibility for the soil samples of FIG. 7.

Percent decrease in bioaccessibility is plotted in FIG. 9 in a graph 900 for the samples of FIG. 8, with the exception of the untreated BO soil. The results shown in FIGS. 8 and 9 show that the heat treated BO soil demonstrated a highest reduction in lead bioaccessibility of approximately 90%. The K-jarosite treated BO soil, while exhibiting a smaller decrease in lead bioaccessibility than that of the heat treated sample, reduced lead bioaccessibility by approximately 80%. As both the heat treated and K-jarosite treated BO soil was found to show high conversion to PLJ phases, the effective reduction in lead bioaccessibility observed for both samples may be attributed to formation of PLJ. Of the aqueous lead samples, the lead nitrate reacted with K-jarosite over a duration of one week shows a greatest decrease in lead bioaccessibility, although the difference in bioaccessibility reduction amongst the aqueous lead samples is relatively small.

The experimental results shown in FIGS. 6-9 confirm that treatment of lead-contaminated soils with either K-jarosite at ambient temperature or heated without K-jarosite to precipitate PLJ are both effective remedial strategies for reducing bioaccessibility of lead. The heat treatment may provide a higher sequestration of contaminant lead in an insoluble phase (e.g., insoluble within a digestive tract) but may demand energy-intensive equipment. Thus, for in situ treatment of contaminated sites, the K-jarosite treatment may be a more practical approach. For example, the K-jarosite treatment may be implemented at the contaminated site by transporting tilling equipment, without demanding use of heating devices and specialized high-temperature tolerant components.

In this way, remediation of contaminated environmental media may be achieved via a fast, low cost, and effective technique. Contaminant materials, forming ions in aqueous solution, may be converted to a nontoxic, environmentally benign phase by incorporating the ions into a structure of a jarosite-group mineral. The jarosite-group mineral may simultaneously sequester more than one type of ion, including ions derived from materials associated with high toxicity, adverse ecological/environmental effects, and radioactive properties. As such, remediation efficiency may be increased for sites contaminated with a variety of materials by application of a single process.

The disclosure also provides support for a method for treating a contaminated environmental medium, comprising: adding a first jarosite-group mineral to the contaminated environmental medium to form a wet mixture under a set of conditions and maintaining the set of conditions over a duration of time to expedite ion substitution at the first jarosite-group mineral to precipitate a second jarosite-group mineral, the second jarosite-group mineral incorporating contaminant cations and contaminant anions into a structure of the second jarosite-group mineral, wherein forming the wet mixture includes adding the first jarosite-group mineral to the contaminated environmental medium in situ at a contamination site. In a first example of the method, adding the first jarosite-group mineral includes adding potassium-jarosite (K-jarosite) to the contaminated environmental medium. In a second example of the method, optionally including the first example, contaminant cations are incorporated into the second jarosite-group mineral to convert at least 65% of the contaminant cations in the contaminated environmental medium into the second jarosite-group mineral, and wherein the second jarosite-group mineral is plumbojarosite. In a third example of the method, optionally including one or both of the first and second examples, the contaminated environmental medium is soil, and wherein the contaminant cations are incorporated to convert 100% of the contaminant cations in the soil to plumbojarosite. In a fourth example of the method, optionally including one or more or each of the first through third examples, the duration of time is between 8 hours and one week. In a fifth example of the method, optionally including one or more or each of the first through fourth examples, mixing the wet mixture includes mixing the wet mixture at ambient temperature, and wherein the set of conditions includes maintaining a temperature of the wet mixture at ambient temperature over the duration of time. In a sixth example of the method, optionally including one or more or each of the first through fifth examples, the set of conditions includes maintaining a pH of the wet mixture below pH 3 over the duration of time. In a seventh example of the method, optionally including one or more or each of the first through sixth examples, the set of conditions includes maintaining a pH of the wet mixture at 2.5 over the duration of time. In a eighth example of the method, optionally including one or more or each of the first through seventh examples, the set of conditions includes heating the wet mixture up to 80° C. for a maximum of 16 hours. In a ninth example of the method, optionally including one or more or each of the first through eighth examples, the set of conditions includes maintaining the wet mixture saturated with a solution of the first jarosite-group mineral over the duration of time. In a tenth example of the method, optionally including one or more or each of the first through ninth examples, adding the first jarosite-group mineral to the contaminated environmental medium includes adding the first jarosite-group mineral to one or more of soil, sediment, water, waste, and radioactive waste.

The disclosure also provides support for a method for treating a site of contamination, comprising: adding potassium-jarosite to a contaminated medium at a contaminated site to form a wet mixture, and maintaining the wet mixture at an acidic pH over a reaction duration to sequester contaminant ions by substituting potassium cations in the potassium-jarosite with the contaminant ions. In a first example of the method, the contaminated medium is soil and adding the potassium-jarosite to the contaminated medium includes tilling an upper layer of the soil, the upper layer being a top 3 to 6 inches of the soil, prior to adding the potassium-jarosite, and saturating the upper layer of the soil with water. In a second example of the method, optionally including the first example, the upper layer of the soil is either heated up to 80° C. or not heated, prior to adding the potassium-jarosite, and a corresponding temperature maintained during at least a portion of the reaction duration. In a third example of the method, optionally including one or both of the first and second examples, adding the potassium-jarosite includes suspending the potassium-jarosite in water, adding the suspended potassium-jarosite to the soil, and adding an acid without sulfate to the soil. In a fourth example of the method, optionally including one or more or each of the first through third examples, adding the potassium-jarosite includes suspending the potassium-jarosite in a ferric sulfate/sulfuric acid solution and adding the suspended potassium-jarosite to the soil. In a fifth example of the method, optionally including one or more or each of the first through fourth examples, the potassium-jarosite is added at a ratio of 30:1 of soil:potassium-jarosite by mass.

The disclosure also provides support for a method for removing contaminant ions from an environmental medium, comprising: seeding formation of plumbojarosite by adding a plumbojarosite precursor to the environmental medium in situ, at a site of the environmental medium, and promoting ion substitution at the plumbojarosite precursor. In a first example of the method, the plumbojarosite precursor is potassium-jarosite, and wherein the potassium-jarosite is synthesized by heating an aqueous solution of potassium hydroxide and ferric sulfate hydrate. In a second example of the method, optionally including the first example, promoting ion substitution at the plumbojarosite precursor includes at least substituting potassium cations of the plumbojarosite precursor with lead cations.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for treating a contaminated environmental medium, comprising:
adding a first jarosite-group mineral and water to the contaminated environmental medium to form a mixture under a set of conditions and maintaining the set of conditions over a duration of time to expedite ion substitution at the first jarosite-group mineral to precipitate a second jarosite-group mineral, the second jarosite-group mineral incorporating contaminant cations and contaminant anions into a structure of the second jarosite-group mineral, wherein forming the mixture includes adding the first jarosite-group mineral to the contaminated environmental medium in situ at a contamination site, and wherein the set of conditions includes a pH of the mixture below 3.

2. The method of claim 1, wherein adding the first jarosite-group mineral includes adding potassium-jarosite (K-jarosite) to the contaminated environmental medium.

3. The method of claim 2, wherein the contaminant cations are incorporated into the second jarosite-group mineral to convert at least 65% of the contaminant cations in the contaminated environmental medium into the second jarosite-group mineral, and wherein the second jarosite-group mineral is plumbojarosite.

4. The method of claim 3, wherein the contaminated environmental medium is soil, and wherein the contaminant cations are incorporated to convert 100% of the contaminant cations in the soil to plumbojarosite.

5. The method of claim 1, wherein the set of conditions includes a temperature and state of saturation of the soil, and the duration of time is between 8 hours and one week.

6. The method of claim 1, wherein forming the mixture includes mixing the mixture at ambient temperature, and wherein the mixture is at ambient temperature over the duration of time.

7. The method of claim 1, wherein the set of conditions includes maintaining a pH of the mixture at 2.5 over the duration of time.

8. The method of claim 1, wherein the set of conditions includes a temperature of the mixture, and maintaining the set of conditions for a duration includes maintaining the temperature up to 80° C. for a maximum of 16 hours.

9. The method of claim 1, wherein the set of conditions includes maintaining the wet mixture saturated with a solution of the first jarosite-group mineral over the duration of time.

10. The method of claim 1, wherein adding the first jarosite-group mineral to the contaminated environmental medium includes adding the first jarosite-group mineral to one or more of soil, sediment, water, waste, and radioactive waste.

11. A method for treating a site of contamination, comprising:
adding water and potassium-jarosite to a contaminated medium at a contaminated site to form a mixture; and
maintaining the mixture at an acidic pH over a reaction duration to sequester contaminant ions by substituting potassium cations in the potassium-jarosite with the contaminant ions.

12. The method of claim 11, wherein the contaminated medium is soil and adding the potassium-jarosite to the contaminated medium includes tilling an upper layer of the soil, the upper layer being a top 3 to 6 inches of the soil, prior to adding the potassium-jarosite, and saturating the upper layer of the soil with water.

13. The method of claim 12, wherein the upper layer of the soil is either heated up to 80° C. or not heated, prior to adding the potassium-jarosite, and a heated or not heated temperature maintained during at least a portion of the reaction duration.

14. The method of claim 12, wherein adding the potassium-jarosite includes suspending the potassium-jarosite in water, adding the suspended potassium-jarosite to the soil, and adding an acid without sulfate to the soil.

15. The method of claim 12, wherein adding the potassium-jarosite includes suspending the potassium-jarosite in a ferric sulfate/sulfuric acid solution and adding the suspended potassium-jarosite to the soil.

16. The method of claim 12, wherein the potassium-jarosite is added at a ratio of 30:1 of the contaminated medium:potassium-jarosite by mass.

17. A method for removing contaminant ions from an environmental medium, comprising:
seeding formation of plumbojarosite by adding a plumbojarosite precursor to the environmental medium in situ, at a site of the environmental medium, and promoting ion substitution at the plumbojarosite precursor; and
maintaining an acidic environmental medium pH while seeding formation of plumbojarosite and promoting substitution.

18. The method of claim 17, wherein the plumbojarosite precursor is potassium-jarosite, and wherein the potassium-jarosite is synthesized by heating an aqueous solution of potassium hydroxide and ferric sulfate hydrate.

19. The method of claim 18, wherein promoting ion substitution at the plumbojarosite precursor includes at least substituting potassium cations of the plumbojarosite precursor with lead cations.

* * * * *